US008873179B1

(12) United States Patent
Hirayama et al.

(10) Patent No.: US 8,873,179 B1
(45) Date of Patent: Oct. 28, 2014

(54) BIT-PATTERNED MEDIA MAGNETIC RECORDING DISK WITH TWO SIZES OF DOTS AND IMPRINT TEMPLATE MADE WITH DIRECTED SELF-ASSEMBLY (DSA) OF BLOCK COPOLYMERS

(71) Applicant: HGST Netherlands B.V., Amsterdam (NL)

(72) Inventors: Yoshiyuki Hirayama, Kokubunji (JP); Taku Iwase, Kokubunji (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/025,615

(22) Filed: Sep. 12, 2013

(51) Int. Cl.
*G11B 5/09* (2006.01)

(52) U.S. Cl.
USPC ......... 360/48; 360/53; 360/77.02; 360/77.06; 360/78.14; 360/135

(58) Field of Classification Search
None
See application file for complete search history.

(56) References Cited

U.S. PATENT DOCUMENTS

| | | | | |
|---|---|---|---|---|
| 6,628,598 B2 * | 9/2003 | Edwards et al. | | 369/99 |
| 6,852,431 B2 * | 2/2005 | Fukutani et al. | | 428/826 |
| 7,443,622 B2 * | 10/2008 | Kaizu et al. | | 360/15 |
| 7,643,234 B2 | 1/2010 | Albrecht et al. | | |
| 7,746,589 B2 * | 6/2010 | Min et al. | | 360/48 |
| 7,835,094 B2 * | 11/2010 | Bedillion | | 360/29 |
| 7,885,026 B2 * | 2/2011 | Lee et al. | | 360/48 |
| 7,911,728 B2 | 3/2011 | Albrecht et al. | | |
| 7,948,701 B2 * | 5/2011 | Albrecht et al. | | 360/48 |
| 7,969,686 B2 * | 6/2011 | Albrecht et al. | | 360/135 |
| 8,300,340 B2 * | 10/2012 | Sakurai et al. | | 360/48 |
| 8,300,341 B2 * | 10/2012 | Itakura et al. | | 360/48 |
| 8,625,229 B2 * | 1/2014 | Albrecht et al. | | 360/75 |
| 8,737,002 B1 * | 5/2014 | Dhanda et al. | | 360/48 |
| 2003/0072971 A1 * | 4/2003 | Fukutani et al. | | 428/694 IS |
| 2007/0092650 A1 * | 4/2007 | Albrecht et al. | | 427/282 |
| 2007/0211592 A1 * | 9/2007 | Sakurai et al. | | 369/47.49 |
| 2007/0258161 A1 * | 11/2007 | Richter et al. | | 360/48 |
| 2009/0002875 A1 * | 1/2009 | Lee et al. | | 360/77.08 |
| 2010/0053809 A1 * | 3/2010 | Weller et al. | | 360/110 |
| 2010/0067142 A1 * | 3/2010 | Pokharel et al. | | 360/77.08 |
| 2010/0067145 A1 * | 3/2010 | Pokharel et al. | | 360/135 |
| 2010/0073810 A1 * | 3/2010 | Ozturk et al. | | 360/77.08 |
| 2011/0242706 A1 * | 10/2011 | Sakurai et al. | | 360/264.1 |
| 2012/0063028 A1 * | 3/2012 | Sakurai et al. | | 360/78.01 |
| 2014/0030554 A1 * | 1/2014 | Kikitsu et al. | | 428/836 |

* cited by examiner

*Primary Examiner* — Dismery Mercedes
(74) *Attorney, Agent, or Firm* — Thomas R. Berthold

(57) ABSTRACT

A bit-patterned media (BPM) magnetic recording disk has two sizes of dots of magnetic material. The large and small dots are formed together in a hexagonal-close-packed (HCP) pattern. In the data regions none of the larger sized dots are adjacent one another; however in the servo regions some of the larger sized dots are adjacent one another. The adjacent larger sized dots form blocks that provide large amplitude "bursts" as the readback signal, as required for servo burst fields. The disk is made by imprint lithography using an imprint template, which can be made by directed self-assembly (DSA) of a block copolymer (BCP). The imprint template has two sizes of recesses, resulting in BPM disks with two sizes of dots. After the disks are imprinted they are exposed to a DC magnetic field, which magnetizes all the dots in the same direction.

15 Claims, 8 Drawing Sheets

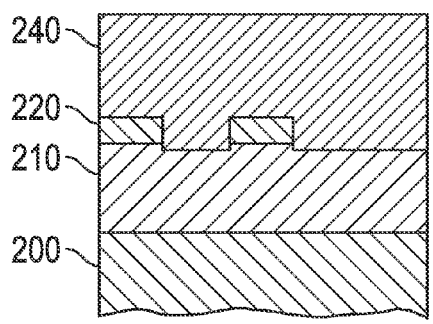
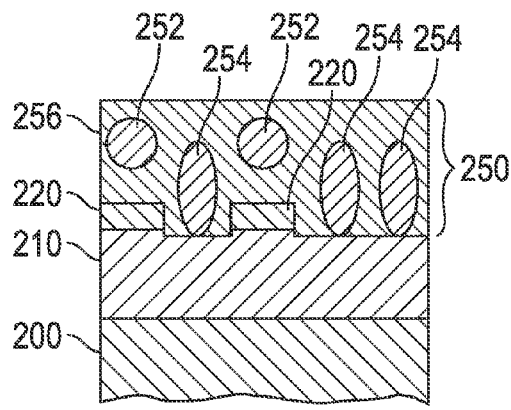
FIG. 6E
FIG. 6F
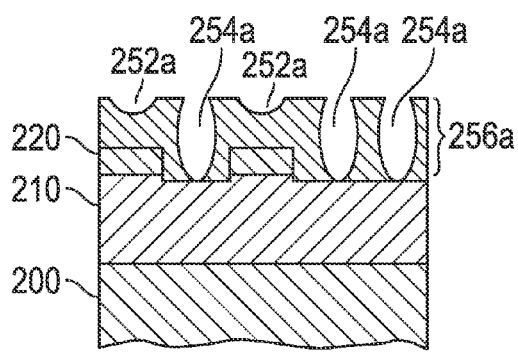
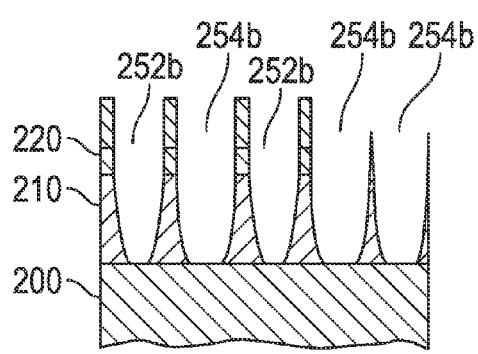
FIG. 6G
FIG. 6H
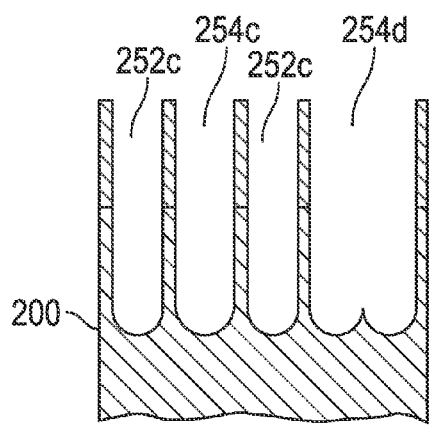
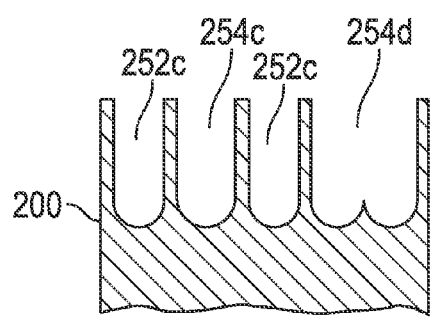
FIG. 6I
FIG. 6J

BIT-PATTERNED MEDIA MAGNETIC RECORDING DISK WITH TWO SIZES OF DOTS AND IMPRINT TEMPLATE MADE WITH DIRECTED SELF-ASSEMBLY (DSA) OF BLOCK COPOLYMERS

BACKGROUND OF THE INVENTION

1. Field of the Invention

This invention relates generally to bit-patterned media (BPM) magnetic recording disks made with an imprint template, and to an imprint template made using directed self-assembly (DSA) of block copolymers.

2. Description of the Related Art

Magnetic recording hard disk drives with patterned magnetic recording media have been proposed to increase data density. In patterned media, also called bit-patterned media (BPM), the magnetic recording layer on the disk is patterned into small isolated data islands or "dots" arranged in data regions in radially-spaced data tracks, with each dot capable of storing an individual bit. Like conventional non-patterned disks, BPM disks are also required to have nondata servo regions or sectors that are used for read/write head positioning. The nondata servo sectors contain servo "burst" fields that generate readback signals that provide radial and circumferential position information about the read/write head. This information in turn is used by the servo system in moving the read/write head to the desired data track and maintaining it on track. In BPM disks the servo burst fields typically contain patterned servo blocks separated by nonmagnetic spaces. However, the complexity of typical servo patterns and the requirement for their precise alignment with the patterned data tracks make the use of conventional servo patterns difficult in BPM disk drives.

One proposed method for fabricating BPM disks is by imprinting with a template, sometimes also called a "stamper" or "mold", that has a topographic surface pattern. In this method the magnetic recording disk substrate with a polymer film on its surface is pressed against the template. The patterns on the template may be protrusions (pillars), or recesses (holes), and the type of the pattern is referred to as the polarity of the template. The polymer film receives the reverse image of the template pattern and then, depending on the polarity of the template, either becomes a mask for subsequent etching of the disk substrate if the template is hole-type, or becomes a sacrificial layer for a tone reversal process such as liftoff followed by etching of the disk substrate, if the template is pillar type, to form pillars on the disk in both cases. In one type of BPM, the magnetic layers and other layers needed for the magnetic recording disk are first deposited on the flat disk substrate. The polymer film used with imprinting is then pressed on top of these layers. The polymer film receives the reverse image of the template pattern and then becomes a mask, or sacrificial layer for tone reversal, for subsequent milling, etching or ion-bombarding the underlying layers.

The template may be a master template for directly imprinting the disks. However, the more likely approach is to fabricate a master template with a pattern of pillars corresponding to the pattern of pillars desired for the disks and to use this master template to fabricate replica templates using imprint lithography. The replica templates may have the opposite or same polarity of the master template. The replica templates are then used to directly imprint the disks.

Directed self-assembly (DSA) of block copolymers (BCPs) has been proposed for making the template and is believed capable of achieving areal bit densities of greater than 1 Terabits/in$^2$. DSA is a technique that involves forming a periodic pattern utilizing the self-assembly of BCPs. An underlayer having optical contrast that has a preferential affinity for one of the copolymers controls the pattern sequence. It has been reported that when DSA is used, it is possible to form a high-precision dot pattern having a pitch of 10 nm or less. However, BCPs have a property whereby the volume thereof is minimized when they self assemble, and therefore although it is easy to form a pattern with equal spacing such as in the data regions, it is difficult to form the complex servo patterns in the servo sectors. A separate process is therefore required to form the servo patterns. However, it is difficult to precisely position the data regions and the servo sectors relative to one another if the two regions are produced in separate processes. Another problem with DSA for making the template is that because the thickness of the BCP layer cannot be precisely controlled, there can be a large variation in the diameter of the dots, i.e., a broad dot diameter distribution.

What is needed is an imprint template made with DSA of BCPs that allows the data regions and servo sectors to be formed simultaneously, and that produces a template with a narrow dot diameter distribution.

SUMMARY OF THE INVENTION

In an embodiment of the invention, the BPM disk has two sizes of dots of magnetic material. The large and small dots are formed together in a hexagonal-close-packed (HCP) pattern. In the data regions none of the larger sized dots are adjacent one another; however in the servo regions some of the larger sized dots are adjacent one another. The adjacent larger sized dots, some of which can be in contact with one another, thus form blocks which provide large amplitude "bursts" as the readback signal, as required for servo burst fields.

The disk is made by imprint lithography using an imprint template. The imprint template may be made by DSA of BCPs. A hardmask layer and a neutral polymer layer are successively formed on a substrate that will become the imprint template. A resist pattern is formed on the neutral layer by electron beam (e-beam) lithography and the exposed neutral layer is etched away, leaving the underlying exposed regions of hardmask layer. The regions of the substrate below the resist exposed by the e-beam will become recesses in the imprint template that will form the larger sized dots. A BCP is deposited on the remaining patterned neutral layer and hardmask layer and annealed. Because the hardmask layer has an affinity for one of the copolymers a hexagonal-close-packed (HCP) pattern of spheres of one of the copolymers self assembles on the hardmask layer and the neutral layer. As a result of the difference in height between the lower spheres on the hardmask layer and the upper spheres on the neutral layer, the subsequent etching of the hardmask layer and underlying substrate results in two sizes of recesses in the imprint template. After the disk is imprinted with the template, it is exposed to a DC magnetic field, which magnetizes all the dots in the same direction.

For a fuller understanding of the nature and advantages of the present invention, reference should be made to the following detailed description taken together with the accompanying figures.

BRIEF DESCRIPTION OF THE DRAWING

FIGS. 6A-6J are sectional views of a portion of a substrate showing the process for making the imprint template that can be used to make the BPM disk having the pattern of large and small dots shown in FIG. 5.

DETAILED DESCRIPTION OF THE INVENTION

Figure 1:
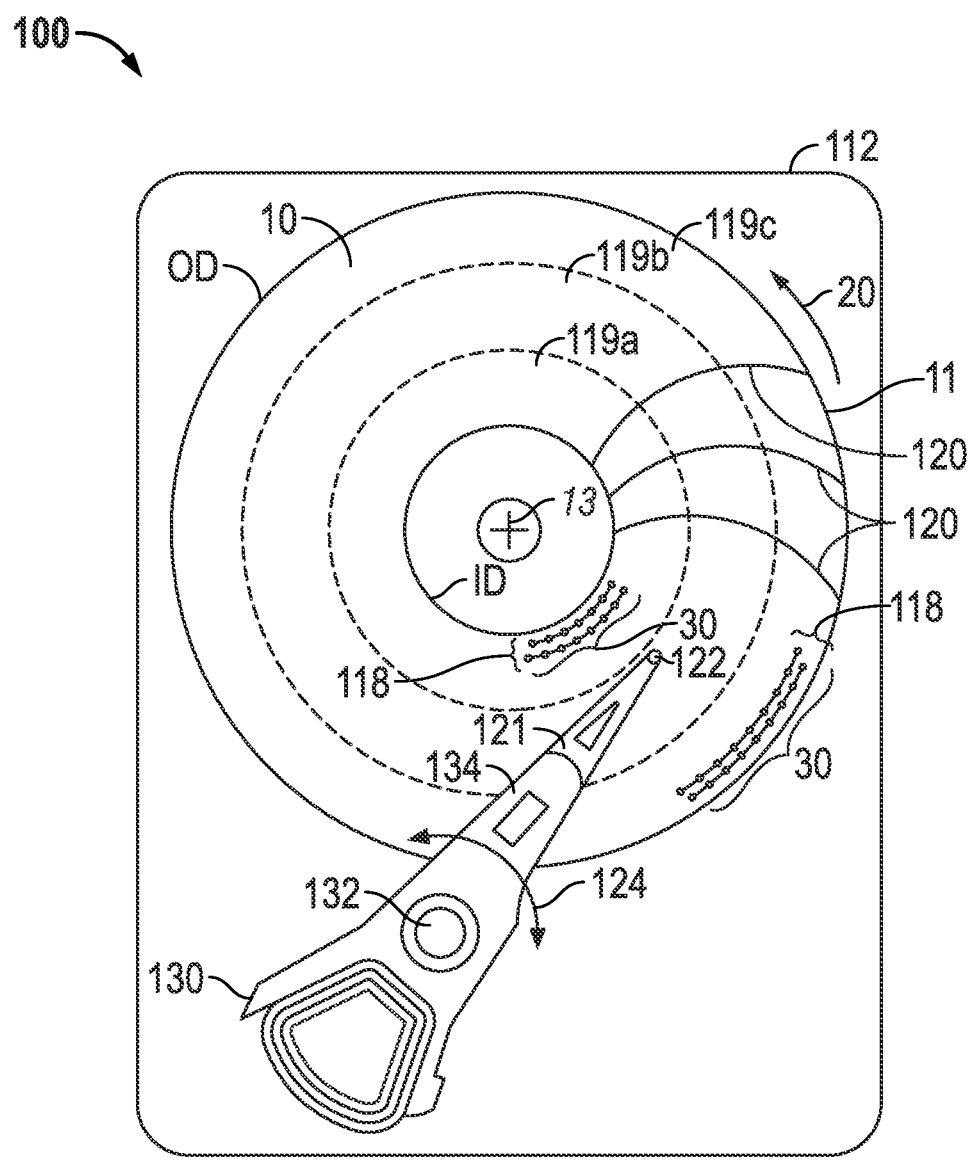
FIG. 1 is a top view of a disk drive with a bit-patterned media (BPM) type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands or dots 30 of magnetizable material on the substrate 11. The data dots 30 function as discrete magnetic bits for the storage of data and are arranged in data regions or sectors in radially-spaced tracks 118, with the tracks 118 being grouped into annular zones 119a, 119b, 119c. The grouping of the data tracks into annular zones permits zoned recording, wherein the angular spacing of the data dots, and thus the data rate, is different in each zone. Within each zone, the tracks are circumferentially divided into a number of data sectors. In FIG. 1, only a few dots 30 and representative tracks 118 are shown in the inner zone 119a and the outer zone 119c. As the disk 10 rotates about its center 13 in the direction of arrow 20, the movement of actuator 130 allows the read/write head on the trailing end of head carrier 122 to access different data tracks 118 on disk 10. Rotation of the actuator 130 about pivot 132 to cause the read/write head on the trailing end of head carrier 122 to move from near the disk inside diameter (ID) to near the disk outside diameter (OD) will result in the read/write head making an arcuate path across the disk 10.

Each data track also includes a plurality of circumferentially or angularly-spaced servo sectors 120. The servo sectors include servo information, including position error signal (PES) fields, detectable by the read/write head. The servo information is used by the disk drive's servo electronics for moving the read/write head to desired data tracks and maintaining the read/write head on the data tracks. The servo sectors 120 in each track are aligned circumferentially with the servo sectors 120 in the other tracks so that they extend across the tracks in a generally radial direction, as represented by radially-directed servo sectors 120. The servo sectors 120 are non-data regions on the disk that are magnetized once in a servo writing process typically during manufacturing or formatting of the disk 10, and are not intended to be erased during normal operation of disk drive 100.

Figure 2:
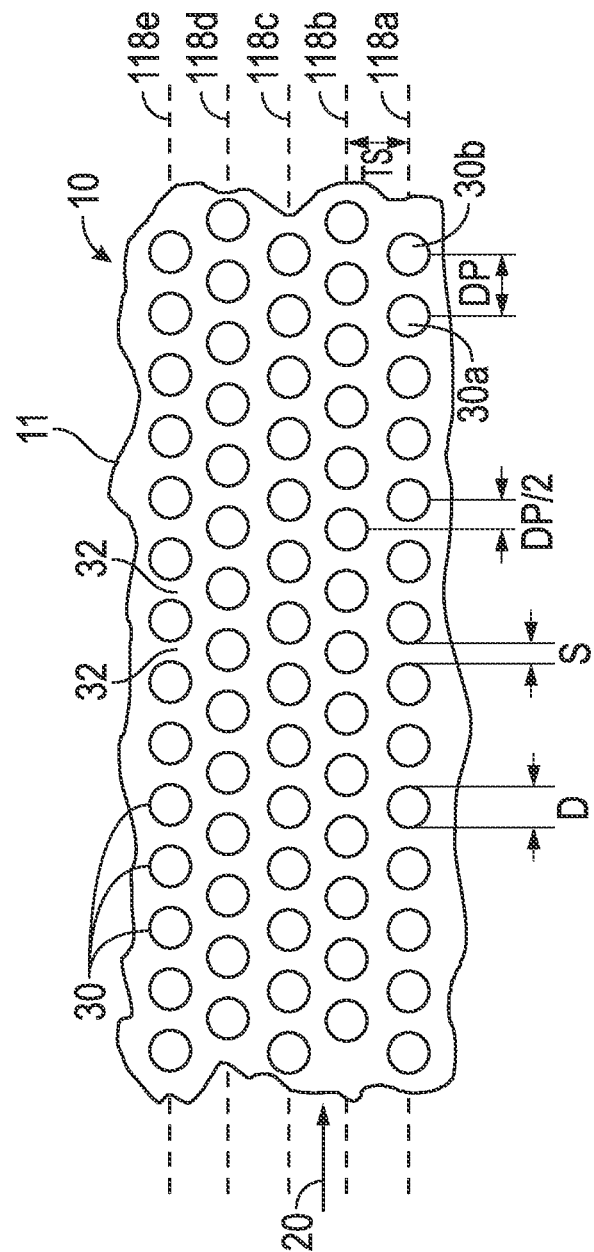
FIG. 2 is a top view of an enlarged portion of a BPM disk showing the detailed arrangement of the data dots in one of the zones on the surface of the disk substrate according to the prior art.

FIG. 2 is a top view of an enlarged portion of disk 10 showing the detailed arrangement of the data dots 30 separated by nonmagnetic regions 32 in one of the data sectors on the surface of disk substrate 11 according to the prior art. The dots 30 are shown as being generally circularly shaped because the disk has been imprinted with a template made using DSA of BCPs that form spheres that self-assemble into a generally hexagonal-close-packed (HCP) pattern. The dots 30 contain magnetizable recording material and are arranged in tracks spaced-apart in the radial or cross-track direction, as shown by tracks 118a-118e. The tracks are typically spaced apart by a nearly fixed track pitch or spacing TS. Within each track 118a-118e, the dots 30 are roughly equally spaced apart by a nearly fixed along-the-track dot pitch DP, as shown by typical dots 30a, 30b, where DP is the spacing between the centers of two adjacent dots in a track. The dots 30 are depicted with a diameter D and a spacing S between adjacent dots.

Figure 3A:
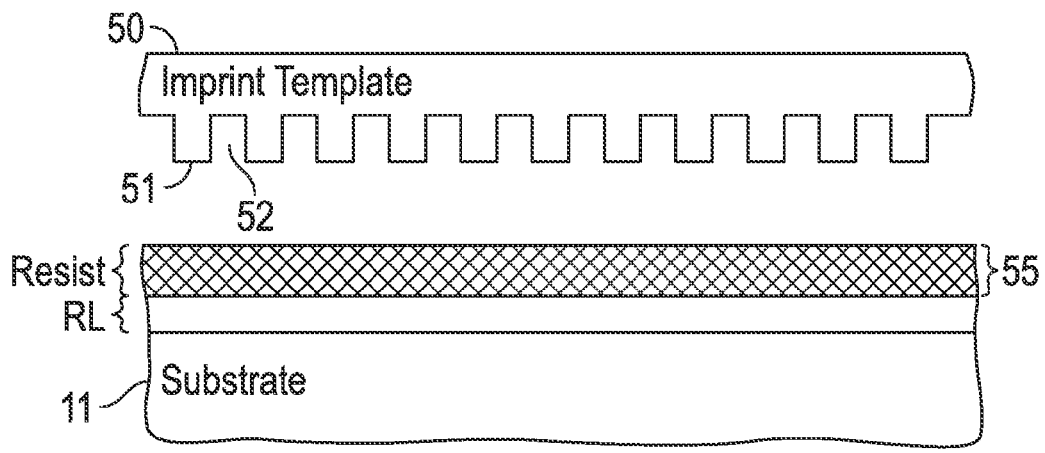
FIGS. 3A-3C are sectional views illustrating the general concept of imprinting a BPM disk according to the prior art.
Figure 3B:
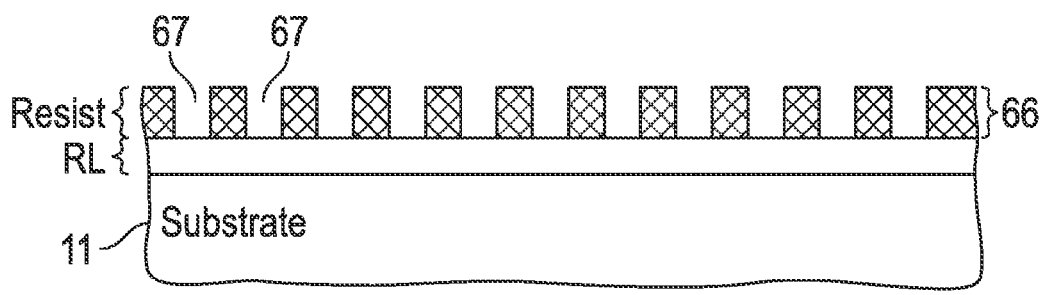
Figure 3C:
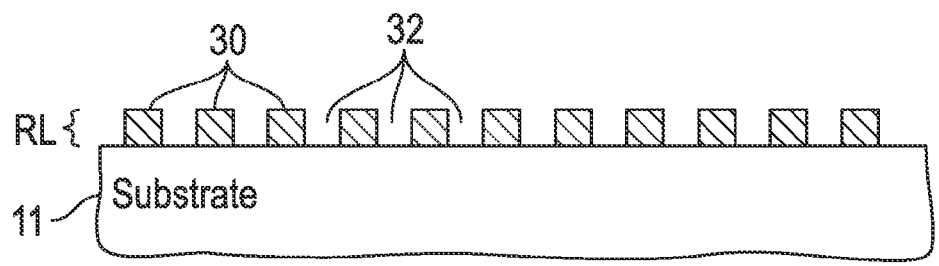

FIGS. 3A-3C are sectional views illustrating the general concept of imprinting. FIG. 3A is a sectional view showing the disk according to the prior art before lithographic patterning and etching to form the data dots. The disk has a substrate 11 supporting a recording layer (RL) having perpendicular (i.e., generally perpendicular to substrate surface) magnetic anisotropy. A layer of imprint resist 55 is formed on the RL. The structure of FIG. 3A is then lithographically patterned by imprinting with a UV-transparent template 50 that has pillars 51 and recesses 52 that will form the desired pattern of data dots. In this example the pillars are generally cylindrically shaped and will form the data dots 30 (FIG. 2) and the recesses 52 will form the nonmagnetic regions 32 (FIG. 2) between the data dots. The template 50 is typically silicon or a fused quartz substrate that has been etched away in different etching steps to form the desired pattern. The template 50 with its predefined pattern is brought into contact with the liquid imprint resist layer, which is a UV-curable polymer, and the template 50 and disk are pressed together. UV light is then transmitted through the transparent template 50 to cure the liquid imprint resist. After the resist has hardened, the template is removed, leaving the inverse pattern of the template on the hardened resist layer. The template is separated from the disk and an imprint resist 66 patterned with a plurality of holes 67 is left. The resulting structure is shown in FIG. 3B. The patterned imprint resist 66 is then used as an etch mask. Reactive-ion-etching (RIE) can be used to transfer the pattern from the imprint resist 66 to the underlying RL. The imprint resist is then removed, leaving the resulting structure of data dots 30 of RL material separated by nonmagnetic regions 32, as shown in FIG. 3C. FIGS. 3A-3C are highly schematic representations merely to illustrate the general imprinting process. The disk would typically include additional layers below the RL. Also the structure of FIG. 3C would typically then be planarized with fill material in the nonmagnetic regions 32, followed by deposition of a protective overcoat and liquid lubricant.

Figure 4:
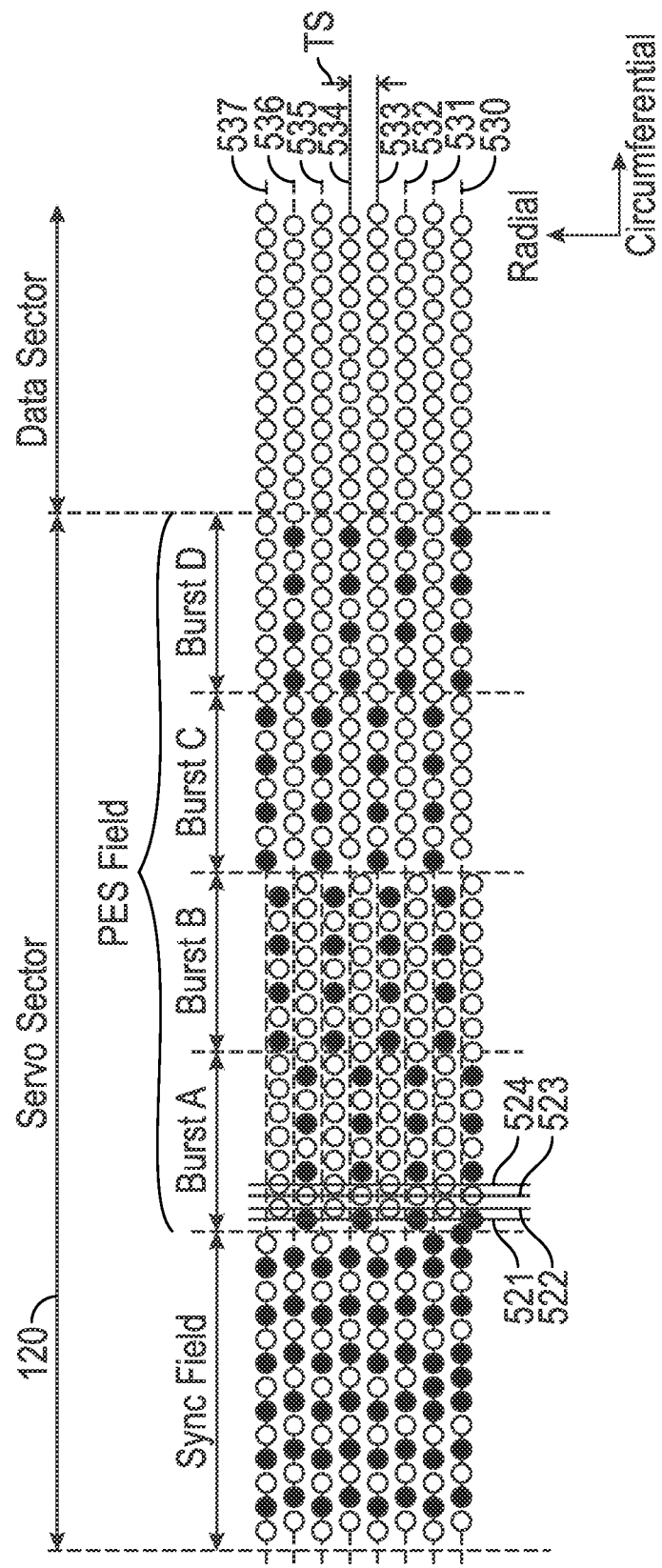
FIG. 4 is an illustration of a portion of a BPM disk showing a data sector and a servo sector with a position error signal (PES) field with discrete dots formed by self-assembly as a hexagonal-close-packed (HCP) array in one embodiment according to the prior art.

FIG. 4 illustrates one prior art example of a BPM disk imprinted from a template where both the servo sectors and the data sectors were formed simultaneously by DSA of BCPs. The discrete dots form a hexagonal-close-packed (HCP) array of discrete "dots" of magnetizable material. The horizontal dotted lines 531-537 in FIG. 4 illustrate the centerlines of the data tracks. The black dots in FIG. 4 represent one polarity of perpendicular magnetization (into or out of the page in FIG. 4), while the white dots represent the opposite polarity. The dots in the data sector represent actual user data and will thus have a complex magnetization pattern utilizing both polarities. Servo sector 120 includes a synchronization (sync) field and a PES field that may include burst fields (A-D). The dots in fields A-B are shown as being radially shifted by one-half track from the dots in fields C-D. As the read/write head traverses the PES field, the amplitude of the various bursts A through D will vary in amplitude, depending on the radial position of the center of read/write head with respect to the centerline of the track.

The dots in servo sector 120 in FIG. 4 are illustrated as hexagonal-close-packed (HCP) arrays of rows of dots that are highly ordered as a result of DSA of BCPs during fabrication of the imprint template. Because DSA of BCPs patterns the servo sectors and the data sectors simultaneously in this prior art example, all of the dots have the same diameter. As a result burst fields A and B must be shifted radially one-half track from burst fields C and D in order for the read head to detect radial positions between the tracks. The problem with the prior art BPM disk shown in FIG. 4 is that, because the dots in the servo sectors all have the same diameter, servowriting is required to write the patterns in the servo sectors. This is shown by the alternating magnetization pattern of the dots in the PES field. The servowriting of the dots in the servo sectors to have the desired pattern of magnetization may be performed in the disk drive using the read/write head, or in a separate dedicated servowriter that also has a read head, a write head and an actuator for moving the heads to the desired tracks. This is a time-consuming process that must be performed on each disk. Also, BPM disks with HCP arrays of same-size dots present a difficult problem in servowriting. Because the dots are formed during a separate disk fabrication process, when the disks are mounted on the rotatable spindle of the servowriter (or the spindle of the disk drive if servowriting is done in the drive) the tracks can never be perfectly aligned with the center of rotation of the spindle. Also, the disk fabrication process may itself result in the data tracks not being perfectly concentric or perfectly circular. This makes it difficult during the servowriting process for the head to magnetize the dots in the servo sectors according to the desired pattern.

In this invention the BPM disk has two sizes of dots. The average diameter of the larger sized dots is preferably at least 1.05 times greater than the average diameter of the smaller sized dots. The large and smaller dots are formed together in a hexagonal-close-packed (HCP) pattern. In the data sectors none of the larger sized dots are adjacent one another; however in the servo sectors some of the larger sized dots are adjacent one another. The adjacent larger sized dots, some of which can be in contact with one another, thus form blocks which provide large amplitude "bursts" as the readback signal, as required for servo "burst" fields.

Figure 5:
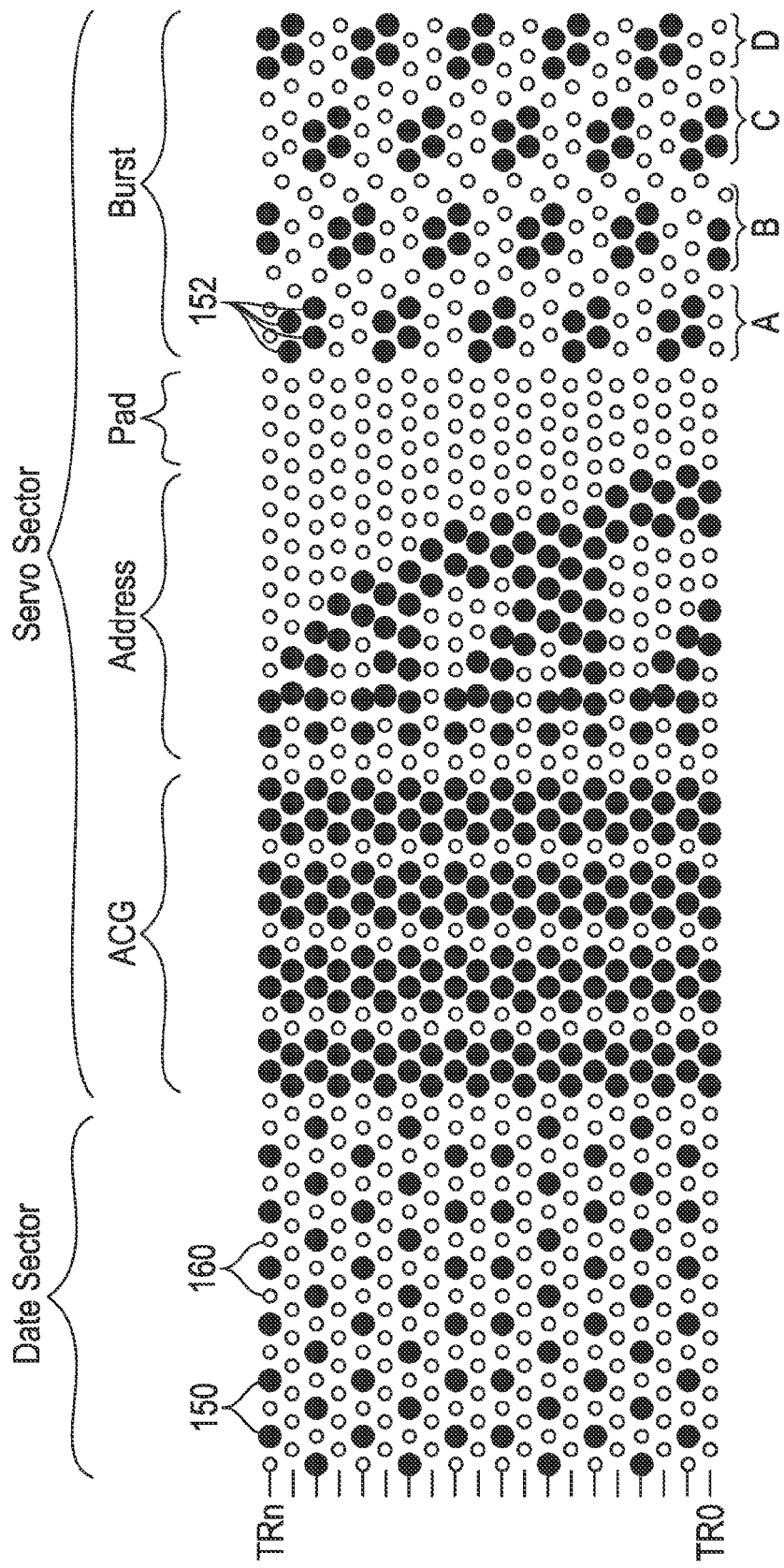
FIG. 5 is a plan view schematically showing a portion of the BPM disk according to an embodiment of the invention.

FIG. 5 is a plan view schematically showing a portion of the BPM disk according to an embodiment of the invention. The data sector is depicted with a plurality of tracks (TR0 to TRn). The data sector has magnetic dots of two different diameters that are regularly and periodically arranged and separated from one another by nonmagnetic regions. All of the dots are magnetized in the same direction by a DC magnetic field after the disk is made by imprint lithography. The large and small dots are arranged together in a hexagonal-close-packed (HCP) pattern as a result of the DSA of the BCPs in the making of the imprint template. For example, as shown in track TRn the large dots 150 alternate with the small dots 160 in the along-the-track direction. Alternate tracks contain only small dots. In the data sector the number of small dots is preferably an integral multiple of the number of large dots. The along-the-track dot pitch in the data sectors can be as small as 30 nm.

The servo sector includes an automatic gain control (AGC) field, a track address field, a pad field, and a burst field. The AGC field outputs a signal used as a reference for amplifying the signals from the address and burst fields to a suitable level. The address field stores address information corresponding to each recording track, so the pattern for each track is different from the patterns for the other tracks. The pad field is provided at the boundary of the address field and burst field to separate the signals from those fields. The burst field provides cross-track position information. The burst field includes A, B, C and D regions that output different signals depending on the cross-track position of the read head. The dots in the servo sector are also formed of large and small dots. However, unlike as in the data sector, some of the large dots are adjacent to one another. The large dots in the servo sector provide the readback signal. For example, in each burst region A-D, there are sets of 4 adjacent large dots that provide the "burst" readback signal that represents the cross-track position of the read head, as shown by typical adjacent large dots 152 in the A burst region. All of the dots in both the data and servo sectors are arranged in a hexagonal-close-packed (HCP) pattern as a result of the DSA of the BCPs in the making of the imprint template.

Figure 6A:
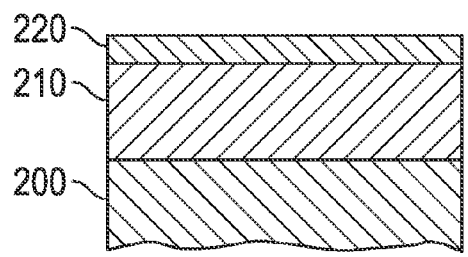

FIGS. 6A-6J are sectional views of a portion of a substrate showing the process for making the imprint template that can be used to make the BPM disk having the pattern of large and small dots shown in FIG. 5. In FIG. 6A a suitable substrate 200, for example silicon or fused quartz, will serve as the imprint template after the processing steps form the desired topographic features. A layer 210 of hard mask material, such as diamond-like carbon (DLC), is deposited to thickness of about 50 nm on the substrate 200. A "neutral" polymer layer 220 is deposited to a thickness of about 7 nm on the hard mask layer 210. A "neutral" polymer has no preferred affinity for either of the copolymers of the BCP. For example, if the BCP to be used as the material for the DSA is PS-b-PMMA (poly-styrene-block-poly(methyl methacrylate)), then the neutral layer has no preferred affinity for either the PS or the PMMA. The neutral polymer layer may be, for example, hydroxyl-terminated random copolymers of styrene and methyl methacrylate containing 43% and 60% of PS.

Figure 6B:
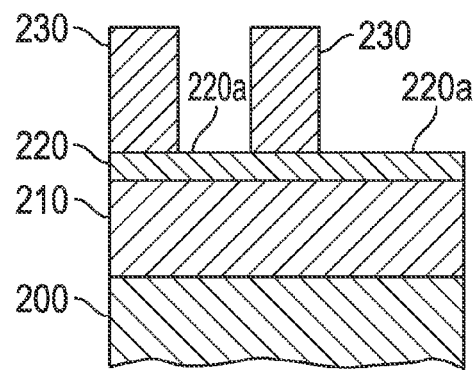

Next, in FIG. 6B a positive electron beam (e-beam) resist was spin-coated to a thickness of about 80 nm on the neutral layer 220, and the resist was patterned by e-beam and developed, leaving resist pattern 230. The e-beam is directed to those regions of the resist that will ultimately result in the features on the imprint template that will form the large dots during the imprinting process, such as typical large dots 150, 152 in FIG. 5. Thus in FIG. 6B the exposed regions 220a of the neutral layer 220 lie above the regions of the substrate 200 that will ultimately contain the holes or recesses that will form the large dots.

Figure 6C:
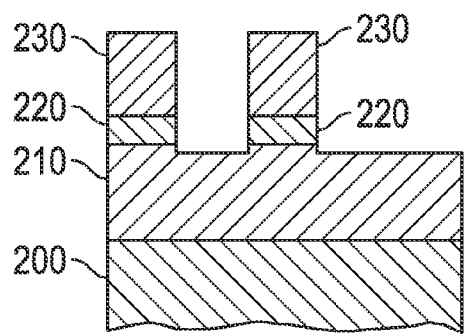

In FIG. 6C the patterned resist 230 is then used as a mask for reactive ion etching (RIE) using oxygen gas to remove the exposed regions 220a of neutral layer 220, thereby exposing the underlying hard mask layer 210. As shown in FIG. 6C this RIE may also remove some of the hard mask layer 210.

Figure 6D:
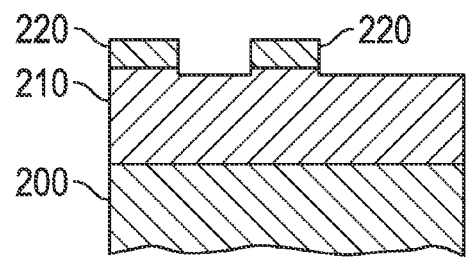

In FIG. 6D the remaining resist 230 is removed by a wet process using a solvent, such as toluene. The exposed hard mask layer 210 in FIG. 6D, for example DLC, has a preferred affinity for PS, while the patterned neutral layer 220 has no preferred affinity for either PS or PMMA.

Next, a block copolymer PS-b-PMMA (polystyrene-block-poly(methyl methacrylate)) is prepared. In FIG. 6E, the PS-b-PMMA block copolymer, diluted with resist thinner is spin-coated on the surface of the pattern of neutral layer 220 and hard mask layer 210 to form a polymer film 240 having a uniform thickness.

In FIG. 6F, the film 240 is annealed for 1 hour at 230° C., whereby a self-assembled film 250 is obtained. Film 250 is thus self-assembled PMMA dots 252 on neutral layer 220 and dots 254 on hard mask layer 210 embedded in a PS matrix 256. All of the PMMA dots 252 and 254 have a generally spherical shape and together become self-assembled in a HCP pattern. The dots have a typical diameter of about 20 nm and are arranged in the HCP pattern with a spacing of about 40 nm. The spherical dots 254 on the lower hard mask layer 210 have an elongated shape, unlike the shape of dots 252 which are more spherical, because they are attracted to the lower hard mask layer 220 while still being urged to self-assemble with the dots 252 on the upper neutral layer 220. The dots 254 in the region of the imprint template that will form the data sectors are thus formed only on the exposed hard mask layer 210 because it has an affinity for the PMMA. These dots then encourage the dots 252 that are on the neutral layer 220 to self-assemble with the dots 254 into the HCP patterns.

In FIG. 6G the PS matrix 256 and the upper dots 252 and lower dots 254 have been etched by RIE. PMMA has a faster etch rate than PS, so all of the PMMA is removed but only a portion of the PS is removed, leaving a thinner PS layer 256a with upper recesses 252a and lower recesses 254a. When all of the PMMA has been etched away the recesses 252a have a much smaller diameter that the diameter of the PMMA dots 252 before etching. However, because the PMMA dots 254 are lower than the dots 252, the lower recesses 254a still retain essentially the same diameter as the diameter of the PMMA dots 254 before etching.

In FIG. 6H, the hard mask layer 210 was etched in RIE with oxygen gas. The RIE proceeds more rapidly in the lower recesses 254a and proceeds laterally because of the wider diameter of the recesses 254a. This more rapid etching and lateral etching produces wider recesses 254b in the hard mask layer that are wider than the recesses 252b that are etched below the upper recesses 252a.

In FIG. 6I, the substrate 200 is etched by RIE in $CF_4$ gas, which replicates the pattern of recesses in the hard mask layer 210 into the substrate 200. Thus the substrate has smaller diameter recesses 252c and larger diameter recesses 254c. Also, it is possible that some of the larger diameter recesses in the substrate 200 can actually merge into an even larger recess, as shown by recess 254d.

In FIG. 6J, the remaining hard mask layer 210 has been removed by an ashing process, leaving an etched substrate that can function as the imprint template to make the BPM disk shown in FIG. 5. The smaller diameter recesses 252c will produce the smaller dots 160 and the larger diameter recesses 254c will produce the larger dots 150, 154. Recesses like 254d resulting from the merger of two adjacent 254c recesses will produce large dots 152 that are in contact with one another. This is in fact desirable because the four adjacent dots 152 in the burst field are intended to produce a single large-magnitude readback signal.

After the disk has been formed by imprint lithography using the substrate of FIG. 6J as the imprint template, it is exposed to a DC magnetic field that magnetizes all the dots in the same direction. Thus all of the dots in the disk of FIG. 5 will have the same magnetization direction, but the larger dots will produce a larger amplitude readback signal. Thus it is not required to servowrite a pattern into the servo sectors. In addition, the data sectors and servo sectors are formed at the same time by a single process, which means there is no positional offset between the data sectors and the servo sectors, so it is possible to control the position of the rad/write read/write head in the disk drive with greater precision.

Figure 7A:
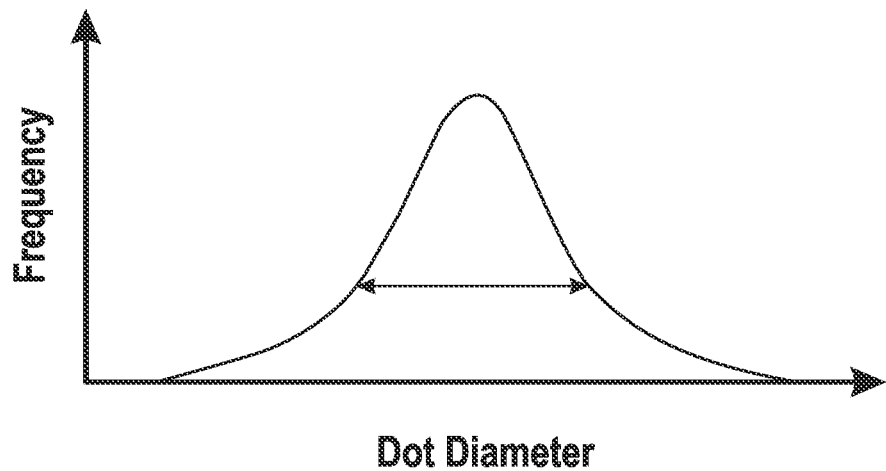
FIG. 7A is a typical dot diameter distribution for a disk with a single size of dots.
Figure 7B:
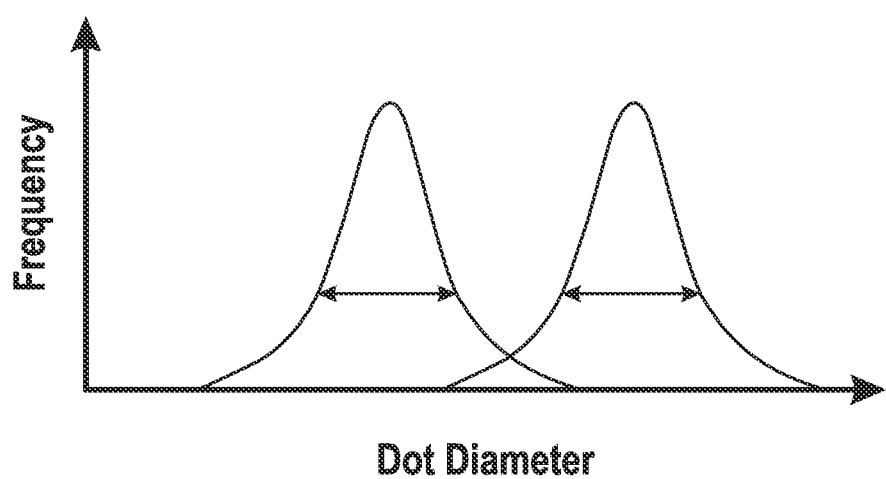
FIG. 7B is the dot diameter distribution for a disk according to the present invention with two sizes of dots.

One of the problems with the prior art BPM disks that have a single size of dots is that there can be a broad dot diameter distribution, a shown by FIG. 7A. In the present invention, imparting two peaks to the dot diameter distribution using two dot sizes narrows the dot diameter distribution. This is shown in FIG. 7B. Thus it is possible to reduce the variation in dot diameter with the present invention.

The method of making the imprint template of the present invention has been described with the use of PS-b-PMMA (polystyrene-block-poly(methyl methacrylate)) as the BCP. Specific examples of other suitable BCPs that can be used for forming the self-assembled periodic patterns include, but are not limited to: poly(styrene-block-methyl methacrylate) (PS-b-PMMA), poly(ethylene oxide-block-isoprene) (PEO-b-PI), poly(ethylene oxide-block-butadiene) (PEO-b-PBD), poly(ethylene oxide-block-styrene) (PEO-b-PS), poly(ethylene oxide-block-methylmethacrylate) (PEO-b-PMMA), poly(ethyleneoxide-block-ethylethylene) (PEO-b-PEE), poly(styrene-block-vinylpyridine) (PS-b-PVP), poly(styrene-block-isoprene) (PS-b-PI), poly(styrene-block-butadiene) (PS-b-PBD), poly(styrene-block-ferrocenyldimethylsilane) (PS-b-PFS), poly(butadiene-block-vinylpyridine) (PBD-b-PVP), poly(isoprene-block-methyl methacrylate) (PI-b-PMMA), and poly(styrene-block-dymethylsiloxane) (PS-b-PDMS).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A bit-patterned-media magnetic recording disk having a substrate and a magnetic recording layer on the substrate, the recording layer comprising two sizes of generally circularly-shaped magnetic dots forming a plurality of radially-spaced tracks having data sectors and servo sectors, wherein the data sectors contain dots of both sizes arranged together in a generally hexagonal-close-packed pattern, wherein the servo sectors extend radially across the tracks and contain dots of both sizes arranged together in a generally hexagonal-close-packed pattern, the servo sectors including at least two circumferentially-adjacent burst regions, each burst region containing a pattern of radially-spaced blocks of at least four adjacent larger sized dots that form the burst, each burst block extending across at least two tracks and together with surrounding smaller sized dots forming part of a hexagonal-close-packed pattern, and wherein the pattern of burst blocks in one of said at least two circumferentially-adjacent burst regions is radially spaced from the pattern of burst blocks in the other of said at least two circumferentially-adjacent burst regions.

2. The disk of claim 1 wherein the data sectors contain dots of both sizes with each larger sized dot being adjacent to only smaller sized dots.

3. The disk of claim 1 wherein the data sectors in every other track contain only smaller sized dots.

4. The disk of claim 1 wherein the data sectors in every other track contain alternating smaller sized dots and larger sized dots in the along-the-track direction.

5. The disk of claim 1 wherein some of the adjacent larger sized dots in some of the burst blocks of some of the burst regions fields are in contact with one another.

6. The disk of claim 1 wherein the average diameter of the larger sized dots is at least 1.05 times greater than the average diameter of the smaller sized dots.

7. An imprint template for making a bit-patterned-media magnetic recording imprint template, the template having two sizes of generally circularly-shaped recesses with substantially different diameters, the recesses of both sizes being arranged together in generally hexagonal-close-packed patterns, the recesses forming a plurality of radially-spaced tracks, each track having data sector recesses and servo sector recesses, wherein the servo sector recesses include recesses of both sizes, some of the servo sector recesses being arranged in blocks of at least four adjacent larger sized recesses that extend across at least two tracks and form part of a hexagonal-close-packed pattern, wherein some of the adjacent larger sized recesses in some of the blocks are in contact with one another.

8. The imprint template of claim 7 wherein the data sector recesses contain recesses of both sizes with each larger sized recess being adjacent to only smaller sized recesses.

9. The imprint template of claim 7 wherein the data sector recesses in every other track contain only smaller sized recesses.

10. The imprint template of claim 7 wherein the data sector recesses in every other track contain alternating smaller sized recesses and larger sized recesses in the along-the-track direction.

11. A bit-patterned-media magnetic recording disk having a substrate and a magnetic recording layer on the substrate, the recording layer comprising two sizes of generally circularly-shaped magnetic dots forming a plurality of radially-spaced tracks with data sectors and a plurality of servo sectors extending radially across the tracks, the data sectors containing dots of both sizes arranged together in a generally hexagonal-close-packed pattern, and the servo sectors containing dots of both sizes arranged together in a generally hexagonal-close-packed pattern, wherein both sizes of dots in the servo sectors are magnetized in the same direction, wherein the servo sectors include burst regions of dots, each burst region containing burst blocks of at least four adjacent larger sized dots, and wherein some of the dots in some of the burst blocks of some of the burst regions are in contact with one another.

12. The disk of claim 11 wherein each larger sized dot in the data sectors is adjacent to only smaller sized dots.

13. The disk of claim 11 wherein the data sectors in every other track contain only smaller sized dots.

14. The disk of claim 11 wherein the data sectors in every other track contain alternating smaller sized dots and larger sized dots in the along-the-track direction.

15. The disk of claim 11 wherein the average diameter of the larger sized dots is at least 1.05 times greater than the average diameter of the smaller sized dots.

\* \* \* \* \*